United States Patent Office 3,246,428
Patented Apr. 19, 1966

3,246,428
METHOD OF DETERMINING IRON DEFICIENCY
IN NUTRIENT SOLUTIONS FOR PLANTS
George M. Sawyer, 3435 W. 110th St., Inglewood, Calif.
No Drawing. Filed Oct. 8, 1964, Ser. No. 402,605
12 Claims. (Cl. 47—58)

This invention relates as indicated to novel compositions adapted to growing plants in nutrient solutions without soil. In particular, the invention relates to a method of determining when the nutrient solution becomes deficient in iron; under certain conditions a solution deficient in iron will also be deficient in other elements as well. This application is a continuation-in-part of my prior application, "Nutrient Compositions for Plants," Serial No. 83,922, filed January 23, 1961, now abandoned.

In growing plants without soil by any system where the roots are surrounded by a nutrient solution, i.e. hydroponics techniques, it has long been known, to those skilled in the art, that the best results are obtained when the solutions are kept properly balanced in nutrient content. It has been demonstrated by others that in addition to maintaining the proper level of iron, it is necessary to maintain the proper level of nitrogen, phosphorous, potassium, magnesium, calcium, sulphur, manganese, boron, zinc, copper, molybedenum, chlorine, cobalt and sodium.

Plants require some nutrients in relatively large amounts and require other elements in extremely small amounts; the requirements of one plant may differ from another. A solution may contain elements in definite proportions so that the plant consumes many elements at the same rate; for example, say, at the end of one week the plant has consumed half each of the initially present elements. In this case, a test which shows half of the initially present iron is now present indicates also that half of all other initially present elements are now present. A solution containing, for example, a yellow colored iron salt will become less yellow as the plant consumes iron. The intensity of the color changes from bright yellow to pale yellow, but the basic color doesn't change, as the solution is still yellow. Another way of stating this is to say that the peak of the transmission curve positioned at yellow, will have steep slopes when the solution is high in iron and have less steep slopes when the solution is low in iron, but the center of the peak will remain at the same yellow wavelength. Visually or by other means the intensity of the yellow colored solution may be used as an indication of iron content. However, the present invention does not make use of visually observing the yellow.

When a material, which for example is blue, is added to the made up solution to color it a color different than the iron compound, which is yellow for example, the eye will see neither color by itself but will see an intermediate color, i.e. green. As the iron is removed from the solution, the yellow contribution to the green color seen by the eye decreases and the color now seen by the eye is more blue than before; when all the yellow is removed, the eye sees only the remaining blue. In this case the color seen by the eye does change as the plant consumes iron, the color changing from green to blue. Another way of stating this is to say that the center of the transmission curve peak changes in wavelength from green to blue as the iron is removed. This is a significant departure from the previous case where the center of the transmission curve peak does not change in wavelength as the iron is removed.

In the field of soilless culture, I am not aware of any prior recommendation for visually observing the solution in order to determine proper nutrient control; generally complicated chemical analyses are recommended which require withdrawing a solution sample, or require passing part of the solution through a complicated optical-electrical-mechanical device.

It is therefore the principal object of this invention to provide a novel method for indicating when nutrients should be replenished to a solution supplying food to plants. In accordance with the new method, a colorant is added to a nutrient solution containing iron nutrient such as iron salt or salts which in the absence of the colorant imparts a first color to the solution, the colorant being in sufficient amount to impart to the solution a second color intermediate of the first color and of a third color characteristically imparted to water by the colorant. As a result, at least partial depletion of the nutrient in the solution will effect a color change therein intermediate of the second and third colors. As will appear, the first, second and third colors may characteristically be yellow, green and blue, respectively.

This invention includes but is not limited to the following iron salts: iron chelate of ethylenediaminetetraacetic acid, iron chelate of diethylenetriaminepentaacetic acid, sodium or potassium ferric diethylenetriaminepentaacetate, sodium or potassium ferric diethylenediaminetetraacetate, ferric or ferrous chloride, ferric fluoride, ferric formate, ferric phosphate, ferric pyrophosphate, ferric sulfate, ferric sulfide, ferrous acetate, ferrous citrate, ferrous tartrate, and ferrous carbonate.

For the colorant used in the present invention, any suitable organic or inorganic pigment or dye may be used. The pigment's primary function is to color the solution and should not be significantly consumed by the plant. Thus, the iron salt can be combined with any pigment or water soluble dye to produce the desired intermediate color. When the plant uses iron, the solution color changes due to the removal of the color caused by the iron salt, thus indicating the need for supplying nutrients to the solution; this can be done by discarding the depleted solution and replacing with a fresh nutrient solution, or by adding more nutrients to the depleted solution.

Although manganese sulfate (pink) and copper sulfate (blue) are frequently used in nutrient solutions, they are used in such trace amounts that they impart no visually perceptable color to the solution; and their intended purpose is to serve as a plant nutrient rather than serve as a dye or pigment.

Any of the well known textbooks or handbooks on chemistry can be referred to for a list of organic and inorganic water soluble dyes and pigments.

Since the present compositions, when used alone or when mixed with other nutrient materials, are used to supply the necessary food to growing plants, they should be used in amounts which will properly support growth, which quantities are readily known to those skilled in the art of horticulture, agriculture, etc. The present compositions can be mixed with any one or all of the nutrients necessary for proper plant growth and can be used as powders, tablets or concentrated solutions or full strength solutions containing predetermined amounts of nutrients; those inexperienced in growing plants in water solutions can easily add a tablet or package or measure to a specified amount of water to result in a nutrient solution of predetermined composition. Thus powders, tablets, or concentrates or full strength solutions can be prepared that contain the iron salt (yellow, for example) and colorant (blue, for example).

Iron may be removed from the solution by the plant using it, or iron may be caused to become insoluble by reacting with other materials present, thus light falling on the solution may cause the formation of insoluble iron compounds. In any case, the result is to cause iron to be unavailable to plants growing in the nutrient solution.

In tests that were performed, iron content was essentially determined by the method of Fortune and Mellon (Ind. Eng. Chem. Anal. Ed., 10, 60 (1938) with minor procedural modifications.

The green nutrient solutions used in the tests were created by adding to one liter of water the following materials (in grams):

| | |
|---|---|
| Potassium nitrate | .6 |
| Ammonium phosphate | .2 |
| Magnesium sulfate | .4 |
| Calcium sulfate | .09 |
| Poly vinyl pyrolidone | .08 |
| Polyethylene glycol | .08 |
| Potassium bicarbonate | .05 |
| Ammonium sulfate | .05 |
| Geigy 330 iron chelate | .05 |
| (sodium ferric diethylentriamine penta-acetate) | |
| Geigy Erio Verdine B. Supra | .0005 |

TEST "A"

Two identical containers were filled with nutrient solution. Container *a* was placed in the sun; container *b*, used as a control, was kept in the dark. At the end of 3 days the solutions were examined. The solution in container *a* was blue; the solution in container *b* was green. The solutions were analyzed by the referenced procedure. Results showed solution *b* contained available iron and solution *a* did not contain available iron.

TEST "B"

Two identical containers were filled with nutrient solution. Container *a* had a small piñon pine tree growing in it, and was placed in the sun. (The solution was contained in an enclosure which did not totally exclude light.) Container *b*, used as a control, was kept in the dark.

At the end of 10 days, the solutions were examined. The solution in container *a* was blue tinged with green. The solution in container *b* was green. The solutions were analyzed by the referenced procedure. Solution *b* contained available iron. Solution *a* contained available iron estimated at about ¼ the amount in solution *b*.

While this specification sets forth in detail the present and preferred construction of the system, still, in practice, such deviations from such detail may be resorted to as not to form a departure from the spirit of the invention as defined by the appended claims.

Typical coloring agents also include the following:

Geigy Setacyl, Bluegreen BSN
Safeway Stores Blue Food Coloring
General Aniline Heliogen Blue
American Cyanamid Soluble American Blue

I claim:

1. In the method of growing plants in hydroponic media, the steps that include adding a colorant to a nutrient solution containing iron salt which in the absence of the colorant imparts a first color to the solution, the colorant being in sufficient amount to impart to the solution a second color intermediate of said first color and of a third color characteristically imparted to water by said colorant, whereby at least partial depletion of the nutrient in the solution will effect a color change therein intermediate of said second and third colors.

2. The method of claim 1 in which said pigment is selected from the group consisting of Geigy Erio Verdine B Supra (blue), Geigy Setacyl Bluegreen BSN, blue food coloring, General Aniline Heliogen Blue, and American Cyanamid Soluble American Blue.

3. The method of claim 1 in which said colorant consists of a water soluble pigment.

4. The method of claim 1 in which said colorant consists of a water soluble dye.

5. The method of claim 1 in which said iron salt is selected from the group consisting of iron chloride, iron fluoride, iron formate, iron phosphate, iron pyrophosphate, iron sulfate, iron sulfide, iron acetate, iron citrate, iron carbonate, iron tartrate and iron chelate.

6. The method of claim 1 in which said first color is yellow.

7. The method of claim 6 in which said third color is blue.

8. The method of claim 1 in which said second color is green.

9. The method of claim 1 in which said iron salt is selected from the group consisting of sodium ferric diethylenetriaminepentaacetate, ferric chloride, ferric fluoride, ferric formate, ferric phosphate, ferric pyrophosphate, ferric sulfate, ferric sulfide, ferrosoferric chloride, ferrous, acetate, ferrous citrate, ferrous chloride, ferrous carbonate and ferrous tartrate.

10. In the method of growing plants in hydroponic media, the steps that include adding to the hydroponic media a composition containing a water soluble iron nutrient and a water soluble colorant to form a nutrient solution, the iron nutrient characterized as by itself imparting a first color to water, the colorant characterized as by itself imparting a third color to water, said nutrient solution characterized as having a second color intermediate said first and third colors, whereby at least partial depletion of the nutrient in the solution will effect a color change therein intermediate of said second and third colors, detecting such a color change, and replenishing sufficient iron nutrient to the solution to restore the solution to said second color.

11. The method of claim 10 in which said water soluble iron nutrient is selected from the group consisting of sodium ferric diethylenetriaminepentaacetate, ferric chloride, ferric fluoride, ferric formate, ferric phosphate, ferric pyrophosphate, ferric sulfate, ferric sulfide, ferrosoferric chloride, ferrous acetate, ferrous citrate, ferrous chloride, ferrous carbonate and ferrous tartrate.

12. The method of claim 10 in which said nutrient contains sodium ferric diethylenetriaminepentaacetate and said colorant consists of a minor amount of a water soluble blue pigment.

References Cited by the Examiner

UNITED STATES PATENTS

| | | | |
|---|---|---|---|
| 1,520,891 | 12/1924 | Spurway | 252—408 |
| 1,849,535 | 3/1932 | Phair | 252—408 |
| 2,270,518 | 1/1942 | Ellis et al. | 47—1.2 X |
| 2,975,553 | 3/1961 | Paul | 47—1 |

ABRAHAM G. STONE, *Primary Examiner.*

R. E. BAGWILL, *Assistant Examiner.*